US006967796B2

(12) United States Patent
Takeuchi et al.

(10) Patent No.: US 6,967,796 B2
(45) Date of Patent: *Nov. 22, 2005

(54) OPTICAL ELEMENT AND OPTICAL SYSTEM

(75) Inventors: Seiji Takeuchi, Utsunomiya (JP);
Ichiro Tanaka, Utsunomiya (JP);
Yasuyuki Tomita, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/393,966

(22) Filed: Sep. 10, 1999

(65) Prior Publication Data
US 2002/0044345 A1    Apr. 18, 2002

(30) Foreign Application Priority Data
Sep. 11, 1998  (JP)  ................................. 10-276615
Sep. 9, 1999   (JP)  ................................. 11-255658

(51) Int. Cl.$^7$ ............................................... G02B 5/18
(52) U.S. Cl. ...................... 359/900; 359/576; 359/614
(58) Field of Search .............................. 359/361, 565, 359/722, 739, 742, 614, 572, 619, 621, 622, 359/576, 900

(56) References Cited

U.S. PATENT DOCUMENTS

| | | | | |
|---|---|---|---|---|
| 3,563,743 A | * | 2/1971 | Cook | 359/572 |
| 4,070,097 A | * | 1/1978 | Gelber | 359/581 |
| 4,309,078 A | * | 1/1982 | Hara et al. | 359/836 |
| 5,004,332 A | * | 4/1991 | Edwards | 359/368 |
| 5,208,700 A | * | 5/1993 | Harris et al. | 359/569 |
| 5,285,314 A | * | 2/1994 | Futhey | 359/572 |
| 5,353,070 A | * | 10/1994 | Mitani et al. | 348/781 |
| 5,373,519 A | * | 12/1994 | Siono et al. | 359/572 |
| 5,648,874 A | * | 7/1997 | Sawaki et al. | 359/619 |
| 5,684,631 A | * | 11/1997 | Greywall | 359/572 |
| 5,822,125 A | * | 10/1998 | Meyers | 359/621 |
| 6,030,250 A | | 2/2000 | Sawayanagi et al. | 439/372 |
| 6,049,401 A | * | 4/2000 | Tanaka et al. | 359/3 |
| 6,381,072 B1 | * | 4/2002 | Burger | 359/621 |
| 6,406,583 B1 | * | 6/2002 | Harden et al. | 156/250 |

FOREIGN PATENT DOCUMENTS

| | | |
|---|---|---|
| JP | 62-250401 | 10/1987 |
| JP | 4-95233 | 3/1992 |
| JP | 4-318955 | 11/1992 |
| JP | 8-21901 | 1/1996 |
| JP | 8-50202 | 2/1996 |
| JP | 8-54508 | 2/1996 |
| JP | 9-179477 | 7/1997 |
| JP | 10-123594 | 5/1998 |

* cited by examiner

*Primary Examiner*—Mark A. Robinson
(74) *Attorney, Agent, or Firm*—Fitzpatrick, Cella, Harper & Scinto

(57) ABSTRACT

A diffractive optical element, which is used for an optical system of an exposure apparatus, includes a light-shielding member composed of a laminated layer of Cr oxide and Cr at a periphery of an effective area.

3 Claims, 15 Drawing Sheets

OPTICAL ELEMENT AND OPTICAL SYSTEM

BACKGROUND OF THE INVENTION

1. Field of the Invention

The present invention relates to an optical element, to a diffractive optical element and other optical systems having these elements, which are suitable for, for example, an imaging optical system to be used for a camera for forming an image of a photographic subject on a surface of a photosensitive material, an image forming optical system for forming image information on a photosensitive drum by optically scanning the surface of the drum, a projection optical system for projecting electronic circuit patterns on a mask as a first photographic subject on a wafer as a second photographic subject using the projection optical system such as a projection lens for producing a device like a semiconductor element such as an IC and LSI, and an illumination optical system for illuminating the mask for projection as described above.

2. Description of the Related Art

A variety of optical systems using diffractive optical elements employing light diffraction phenomenon have been proposed in recent years. Examples of diffractive optical elements known in the art include Fresnel zone plates, kinoforms, binary optics, and holograms.

Diffractive optical elements are used as optical elements for converting an incident wavefront into a prescribed wavefront. These diffractive optical elements have characteristics that are not found in refractive optical elements. For example, diffractive optical elements have characteristics such as inverse dispersion of the reflective optical elements and the optical system can be compact since the element has substantially no thickness.

Generally speaking, semiconductor manufacturing techniques can be applied for producing diffractive optical elements when it assumes, for example, a binary type configuration, making it possible to relatively easily realize fine pitches. Accordingly, studies on binary type diffractive optical elements in which a blazed configuration is approximated by a stepped structure have been aggressively pursued in recent years.

FIG. 22 to FIG. 24 show illustrative drawings of the main portions of conventional diffractive optical elements.

FIG. 22 shows a Fresnel zone plate, in which a light-shielding member where metallic film is to remain and light-transparent portions where no film is to remain is formed by printing the Fresnel zone by a lithographic process after depositing a metallic film such as a chromium film on a glass substrate. FIG. 23 shows a cross section of a Fresnel lens (kinoform) in which each of the annular periodic patterns along the radius direction follows a continuously curved surface that is formed by cutting or press work. FIG. 24 shows a binary type diffractive optical element comprising a phase difference type diffraction grating machined into steps by repeating plural lithographic processes on the surface of a glass substrate.

FIG. 25 to FIG. 27 show a cross section of the main part of an optical barrel having a conventional diffractive optical element.

In FIG. 25, the diffractive optical element 2501 is inserted into the barrel 2502, the diffractive optical element 2501 having approximately the same effective aperture as that of the barrel 2502. In FIG. 26, the diffractive optical element 2601 is also inserted into the lens barrel 2602 as shown in FIG. 25, the diffractive optical element 2601 having a larger effective aperture than that of the barrel 2602. As shown in FIG. 27, the periphery of the diffractive optical element 2701 is shaved off close to the vicinity of the circumference where the element serves as a diffractive optical element. The reference numeral 2702 denotes the barrel.

Meanwhile, stray light is generated when the light incident on the diffractive optical element impinges on the area outside the diffraction grating, deteriorating optical characteristics.

Accordingly, Japanese Patent Laid-Open Nos. 62-250401 and 4-95233 propose a diffractive optical element in which a light-shielding film is provided outside of the effective area of the diffraction grating.

Various advantages as described above can be obtained when the diffractive optical element is used as a part of the optical system. However, it is difficult, for example, in the diffractive optical element shown in FIG. 25 to assemble it by fitting its effective aperture with the effective aperture of the barrel to leave a portion having no diffraction properties of the diffractive optical element within the effective aperture of the barrel, causing excessive light A to be generated. When the effective aperture of the diffractive optical element is made to be larger than the effective aperture of the barrel as shown in FIG. 26, on the other hand, a problem was encountered in that an excess machining cost was incurred for EB painting of the mask required for machining of the peripheral portion where no light beam should pass through. In addition, fine dust and foreign matter adhere in the diffractive optical element unit, as shown in FIG. 27, since cutting of the portions close to the diffraction grating is required, also causing scattering to occur.

Accordingly, there was a problem in that good quality of diffractive optical elements and optical systems using the optical elements cannot be manufactured because excessive light and scattered light are generated in all the conventional diffractive optical elements.

While stray light is prevented from being generated in the diffractive optical element proposed in Japanese Patent Laid-Open Nos. 62-250401 and 4-95233 cited above by providing a light-shielding film at the periphery of the effective area, detailed constructions of the light-shielding films are not disclosed.

A proper choice of this sort of light-shielding material is crucial, otherwise undesirable substances may be generated from the material by UV irradiation or when gas emitted from the material is decomposed by UV light to generate undesirable substances that fog the lens, thereby shortening the service life of the exposure apparatus. A light-shielding member which is directly exposed to the light is particularly susceptible.

SUMMARY OF THE INVENTION

Accordingly, an object of the present invention is to provide a diffractive optical element that does not generate any excessive light or scattered light by properly selecting the light-shielding member constituting the optical elements such as a diffractive optical element and is readily manufactured while maintaining good optical performance, and an optical system using the element.

According to the present invention, a light-shielding member comprising a ceramic or a metal that does not generate any undesirable substances by UV irradiation is provided at the periphery of an optical element such as a lens, mirror, and diffractive optical element.

Another optical element according to the present invention is provided with an effective area and a light-shielding area in the periphery of the effective area, the light-shielding area shielding UV-laser light with a wavelength of 250 nm or less while generating no undesirable substances due to the laser light.

Another optical element according to the present invention is provided with an effective area and a light-shielding area in the periphery of the effective area, the light-shielding area shielding UV light while generating no undesirable substances due to the UV light.

Another optical element according to the present invention is provided with an effective area and a light-shielding area in the periphery of the effective area, the light-shielding area shielding radiation energy while generating no undesirable substances due to the radiation energy.

Another optical element according to the present invention is provided with an effective area and a light-shielding area in the periphery of the effective area, the light-shielding area shielding UV laser light with a wavelength of 250 nm or less while being resistant to the laser light.

Another optical element according to the present invention is provided with an effective area and a light-shielding area in the periphery of the effective area, the light-shielding area shielding UV light while being resistant to the UV light.

Another optical element according to the present invention is provided with an effective area and a light-shielding area in the periphery of the effective area, the light-shielding area shielding radiation energy while being resistant to the radiation energy.

The optical element is provided with a light-shielding member comprising an inorganic material at the periphery of an optical element.

The material of the optical element comprises a thin film ceramic.

The material of the optical element comprises at least one of TiC, TiN, ZrC, ZrN, HfC and HfN.

The material of the optical element comprises metallic materials.

The material of the optical element comprises a metal subjected to reflection preventive treatment.

The material of the optical element comprises at least one of chromium, aluminum, molybdenum, tantalum and tungsten.

The reflection preventive treatment of the optical element comprises a laminated structure of a metal oxide layer on the light-shielding member.

The metal oxide layer of the optical element comprises at least one of silicon oxide and aluminum oxide.

The material of the optical element comprises a compound of a metal and silicon.

The material of the optical element comprises a compound of at least one of molybdenum and tungsten, and silicon.

The material of the optical element comprises a semiconductor material.

The material of the optical element comprises silicon.

The material of the light-shielding member in the optical element comprises a metal oxide.

The present invention has a light-shielding member composed of a metal subjected to an anti reflection treatment, the light-shielding member composed of a low reflection chromium film, or a multi-layer film of a chromium oxide and metallic chromium; a diffraction grating formed at the central area of the optical element, the ceramic material composed of either TiC, TiN, ZrC, ZrN, HfC or HfN, or a combination thereof, the ceramic material absorbing light of a wavelength to be used; an alignment mark provided on the light-shielding member; a light-shielding member comprising a metal and an alignment mark provided at the periphery of the optical element; the light-shielding member and the alignment mark provided by printing; and the portions where the light-shielding ink to be used for printing is illuminated with the light to be used does not protrude.

DESCRIPTION OF THE PREFERRED EMBODIMENTS

Figure 1A:
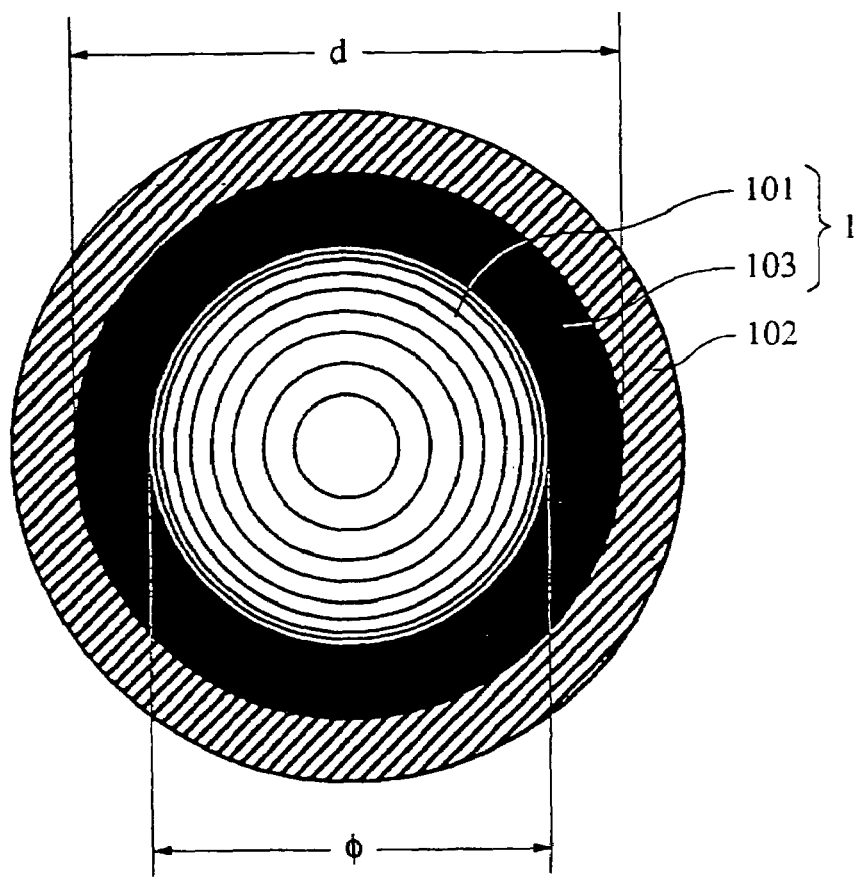
FIG. 1A and FIG. 1B show cross sections of the main part of the diffractive optical element in the first embodiment according to the present invention.
Figure 1B:
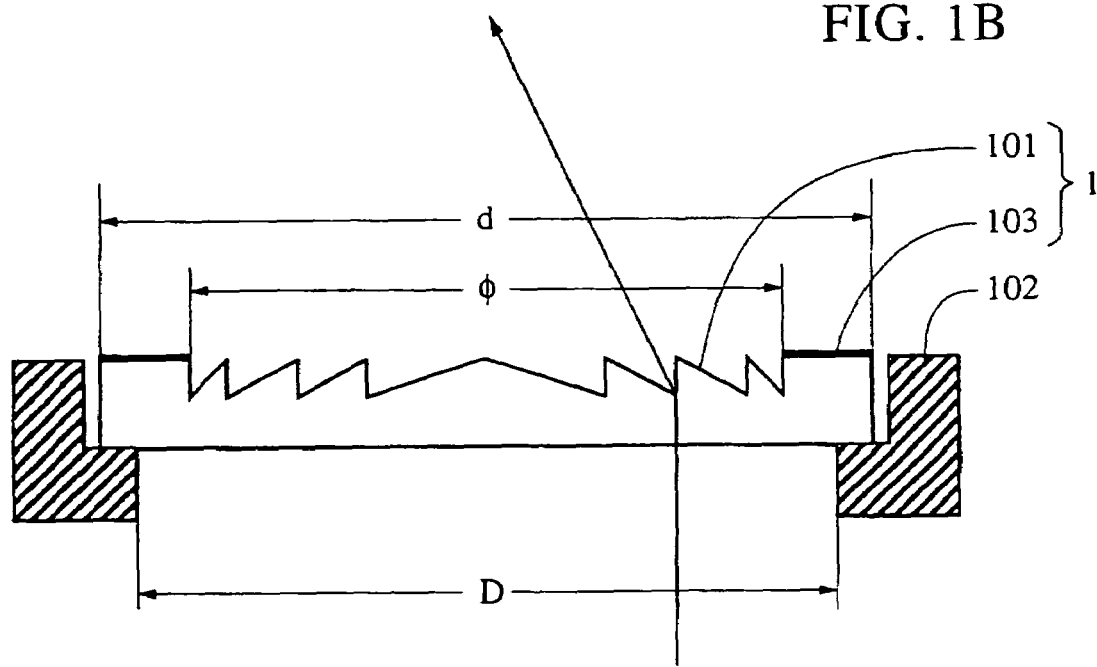

FIG. 1A and FIG. 1B show a front view and cross section, respectively, of the main part in the first embodiment of the optical barrel having the diffractive optical element according to the present invention. In the drawing, the reference numeral 1 denotes a diffractive optical element having a grating member 101 provided with a diffraction grating with a binary shaped (stepped shaped), kinoform shaped, or frennel shaped cross section and a light-shielding member 103 provided at the face side where the diffraction grating 101 is formed at a given width in the optically non-effective area around the periphery of the diffraction grating 101. The reference numeral 102 denotes a barrel (a holding frame) holding the diffractive optical element 1.

The letter $\phi$, d, and D denote an effective aperture size of the grating member 101 of the diffractive optical element 1, an aperture size of the diffractive optical element 1 and an aperture size of the barrel 102, respectively. Although the present embodiment refers to a transmission type diffractive optical element 1 through which the incident light within the area of the aperture passes through, it may represent a reflection type diffractive optical element 1 having a reflection film within the area for reflecting the incident light within the aperture.

The method for manufacturing the diffractive optical element 1 according to the present invention will be described hereinafter referring to FIG. 2 through FIG. 9. A so-called lithographic technique is used for the manufacturing method described above.

In this embodiment, a low-reflection chromium layer as a material of the light-shielding member is formed on the substrate, followed by manufacturing the diffractive optical element having a diffraction grating comprising four steps.

The low-reflection black chromium layer 205 is composed of a chromium layer and a chromium oxide layer, the black chromium layer comprising two layers of the chromium layer and chromium oxide layer or the chromium oxide layer and chromium layer, or three layers in which the chromium layer 203 is inserted between the chromium oxide layers 202 and 204. The layer construction of the light-shielding member is selected depending on the requirement for lowering the reflection. The three layered construction will be described in this embodiment.

Figure 2:
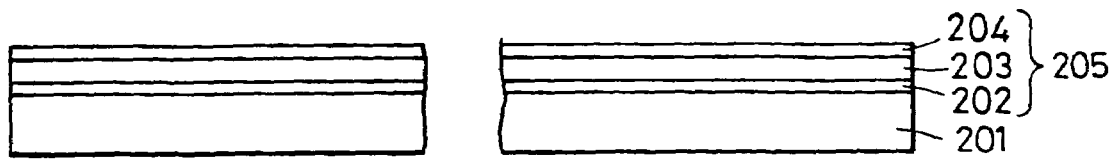
FIG. 2 shows an illustrative drawing of the diffractive optical element according to the present invention in a manufacturing step in the first embodiment.

As shown in FIG. 2, the chromium oxide ($CrO_x$) film 202 with a thickness of 300 Å is first deposited by sputtering on a transparent quartz substrate 201, followed by depositing the chromium (Cr) film 203 at a thickness of 1000 Å by sputtering. The chromium oxide ($CrO_x$) film 204 with a thickness of 300 Å is further deposited on the above two films.

Figure 3:
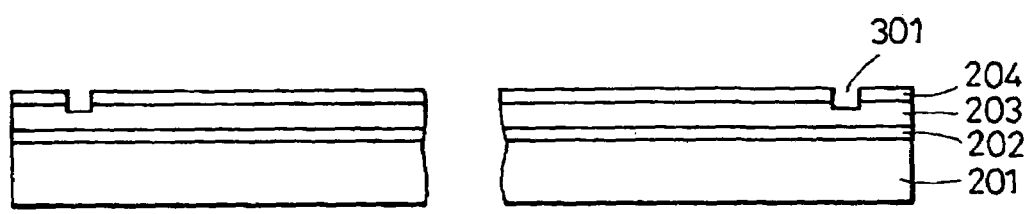
FIG. 3 shows an illustrative drawing of the diffractive optical element according to the present invention in a manufacturing step in the first embodiment.

An alignment mark 301 as a reference point for the subsequent alignment is formed on a part of the low reflection chromium layer 205. For this purpose, the chromium oxide film 204 is removed by a reactive ion etching method after allowing the low reflection chromium layer to be exposed solely at the portion where the alignment mark is formed by spin-coating a photoresist. An etching gas such as chlorine gas or a mixed gas of chlorine gas and oxygen gas is used for etching. Over-etching may be permitted provided that the chromium layer remains. The photoresist is then peeled off in the next step. FIG. 3 shows an illustrative drawing after applying the foregoing steps.

Figure 4:
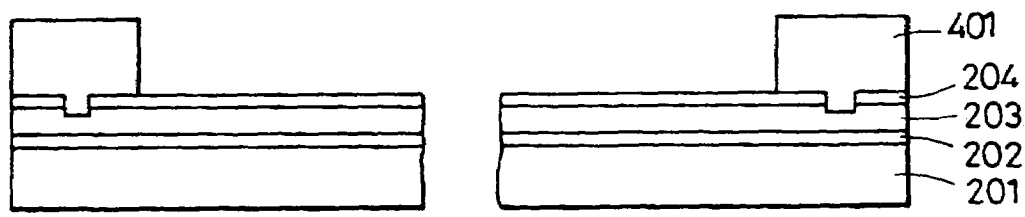
FIG. 4 shows an illustrative drawing of the diffractive optical element according to the present invention in a manufacturing step in the first embodiment.
Figure 5:
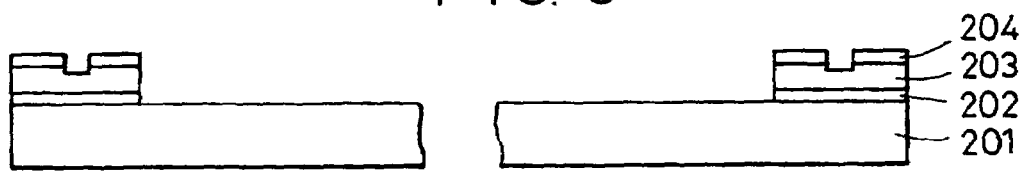
FIG. 5 shows an illustrative drawing of the diffractive optical element according to the present invention in a manufacturing step in the first embodiment.

Then, the photoresist is spin-coated to form a pattern (a resist pattern) 401 on only the portion to serve as the light-shielding member 103 so that the low-reflection chromium film does not protrude. FIG. 4 shows an illustrative drawing after this step. The upper chromium oxide layer 204, the intermediate chromium layer 203 and the lower chromium layer 202 are removed by a reactive ion-etching. An etching gas such as chlorine gas or a mixed gas of chlorine gas and oxygen gas is used for etching. Subsequently, the photoresist 401 is peeled off. FIG. 5 shows an illustrative drawing after this step.

Next, an etching step of the grating member 101 is carried out.

Figure 6:
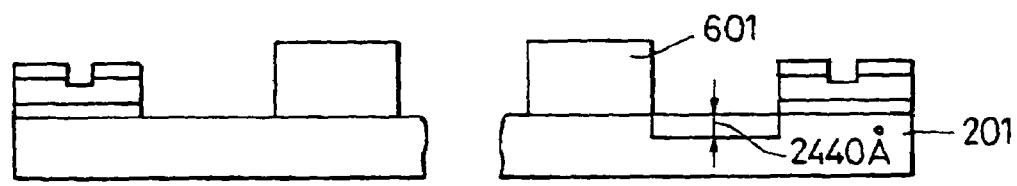
FIG. 6 shows an illustrative drawing of the diffractive optical element according to the present invention in a manufacturing step in the first embodiment.
Figure 7:
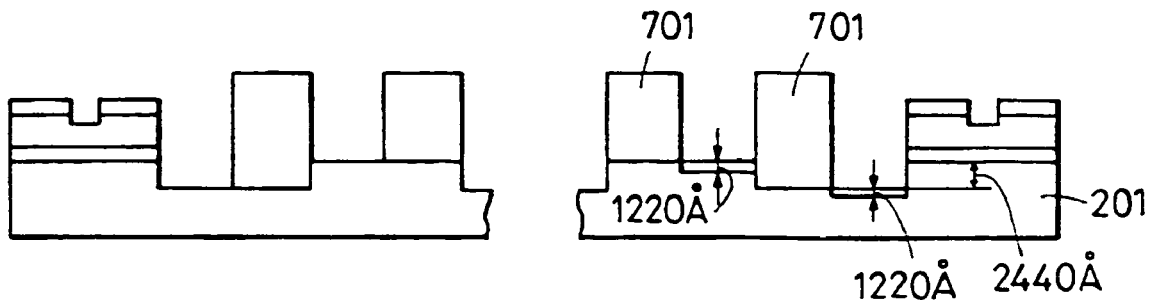
FIG. 7 shows an illustrative drawing of the diffractive optical element according to the present invention in a manufacturing step in the first embodiment.
Figure 8:
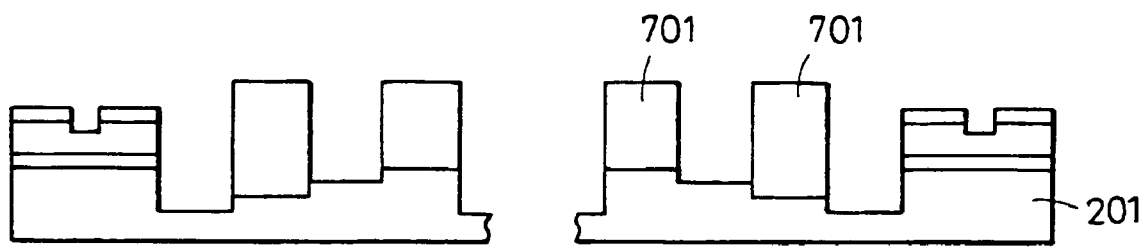
FIG. 8 shows an illustrative drawing of the diffractive optical element according to the present invention in a manufacturing step in the first embodiment.
Figure 9:
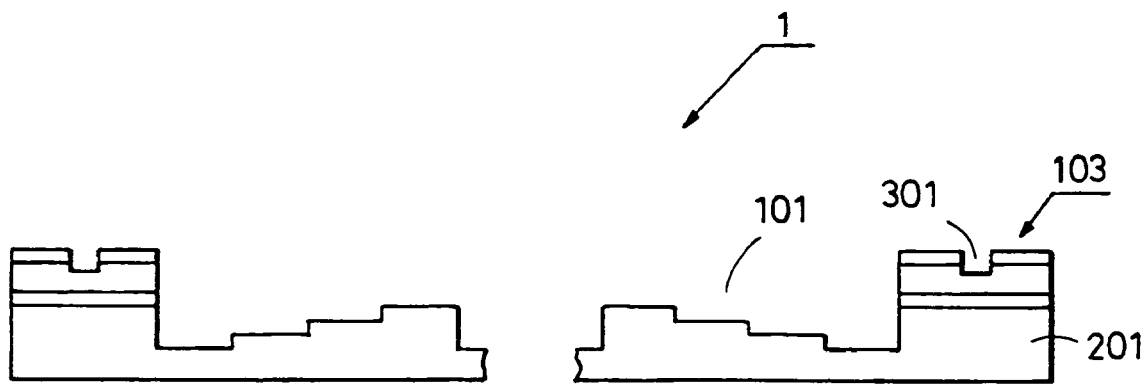
FIG. 9 shows an illustrative drawing of the diffractive optical element according to the present invention in a manufacturing step in the first embodiment.

A photoresist is coated on the substrate 201 as shown in FIG. 5 to form a first resist pattern 601. FIG. 6 shows an illustrative drawing after the above step. The quartz substrate 201 is subsequently etched to a depth of 2440 A using the resist pattern 601 as a mask, followed by peeling 15 the resist pattern 601. Then, the photoresist is coated on the substrate 201 to form a second resist pattern 701. FIG. 7 shows an illustrative drawing after the above step. Subsequently, the quartz substrate 201 is subsequently etched to a depth of 1220 A using the resist pattern 701 as a mask. FIG. 8 shows an illustrative drawing after the above step. Finally, the photoresist pattern 701 is peeled to manufacture the diffractive optical element having the light-shielding member as shown in FIG. 9 on the diffraction face. The remaining work is only to insert the diffractive optical element 1 into the barrel 102 and the like as shown in FIG. 1. When a highly precise centering between the barrel 102 and diffractive optical element 1 is required, centering between the barrel 102 and diffractive optical element 1 is simplified by taking advantage of the alignment 5 mark 301 used in the process for mounting in the lens barrel 102.

When a member composed of a metal such as the low reflection chromium or a combination thereof with an inorganic material is used, the gas emitted due to light irradiation is reduced, resulting in no fogging of the lens, increasing the service of the instrument.

The method for manufacturing the refractive optical element in the second embodiment according to the present invention will be described hereinafter referring to FIG. 10 through FIG. 16.

While the light-shielding member is made of the low reflection chromium film as in the first embodiment, the light-shielding member is formed after manufacturing the diffractive optical element having the diffraction grating comprising four steps in the manufacturing method according to this embodiment. FIG. 10 through FIG. 16 show a stage of the manufacturing method in this embodiment.

Figure 10:
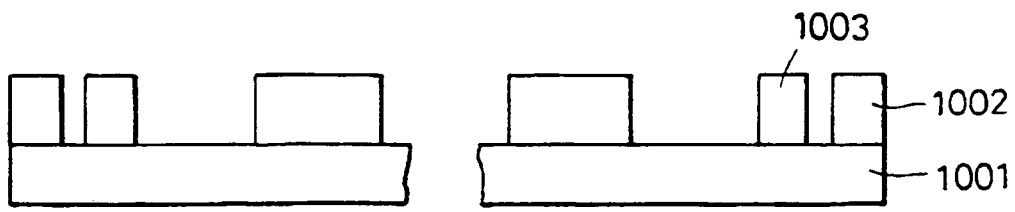
FIG. 10 shows an illustrative drawing of the diffractive optical element according to the present invention in a manufacturing step in the second embodiment.
Figure 11:
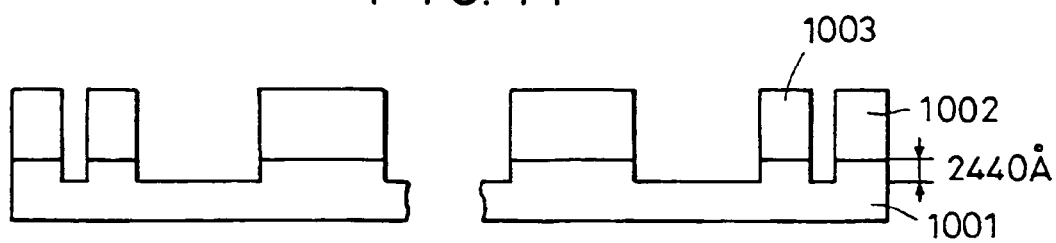
FIG. 11 shows an illustrative drawing of the diffractive optical element according to the present invention in a manufacturing step in the second embodiment.
Figure 12:
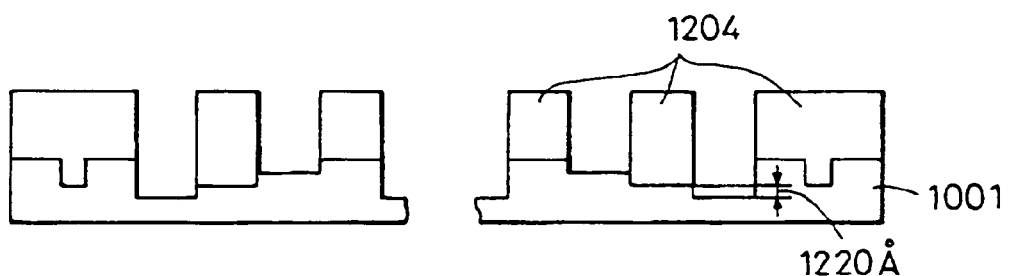
FIG. 12 shows an illustrative drawing of the diffractive optical element according to the present invention in a manufacturing step in the second embodiment.

A photoresist is coated on a quartz substrate 1001 to form a first resist pattern 1002. A resist pattern 1003 for the alignment mark to serve as a reference point for the succeeding steps is simultaneously formed. FIG. 10 shows an illustrative drawing after the above steps. Then, the quartz substrate 1001 is subsequently etched to a depth of 2440 Å using the resist pattern 1002 as a mask. FIG. 11 shows an illustrative drawing after the above steps. Then, a photoresist is coated on the substrate 1001 to form a second resist pattern 1204. Subsequently, the quartz substrate 1001 is etched to a depth of 1220 Å using the resist pattern 1204 as a mask. FIG. 12 shows an illustrative drawing after the above steps. Finally, the photoresist pattern 1204 is peeled to complete the diffractive optical element 1 as shown in FIG. 13.

Figure 13:
FIG. 13 shows an illustrative drawing of the diffractive optical element according to the present invention in a manufacturing step in the second embodiment.
Figure 14:
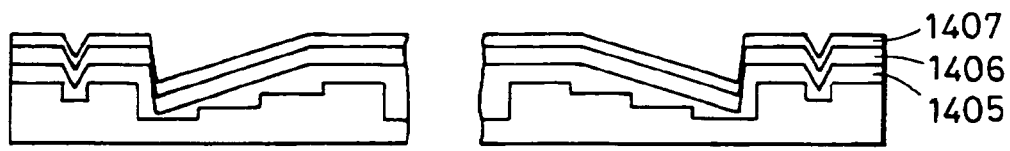
FIG. 14 shows an illustrative drawing of the diffractive optical element according to the present invention in a manufacturing step in the second embodiment.

In the next step, a chromium oxide ($CrO_x$) film 1405 with a thickness of 300 Å is deposited on the substrate 1001 shown in FIG. 13 by sputtering, followed by depositing a chromium (Cr) film 1406 with a thickness of 1000 Å by sputtering. Subsequently, a chromium oxide ($CrO_x$) film 1407 with a thickness of 300 Å is deposited by sputtering. FIG. 14 shows an illustrative drawing after the above steps.

Figure 15:
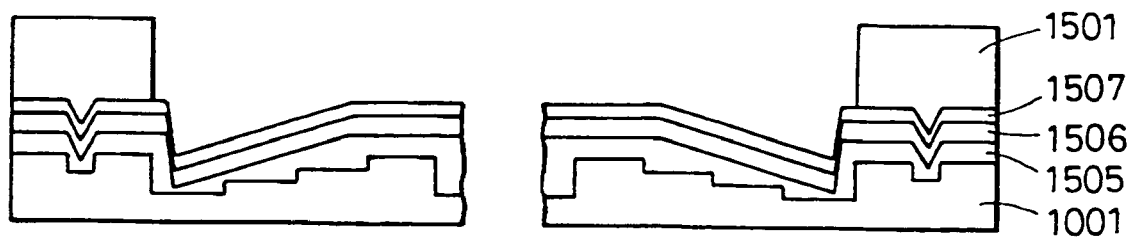
FIG. 15 shows an illustrative drawing of the diffractive optical element according to the present invention in a manufacturing step in the second embodiment.

Then, a pattern 1501 is formed by spin-coating the photoresist so that only the light-shielding member 103 is masked. FIG. 15 shows an illustrative drawing after the above steps.

Figure 16:
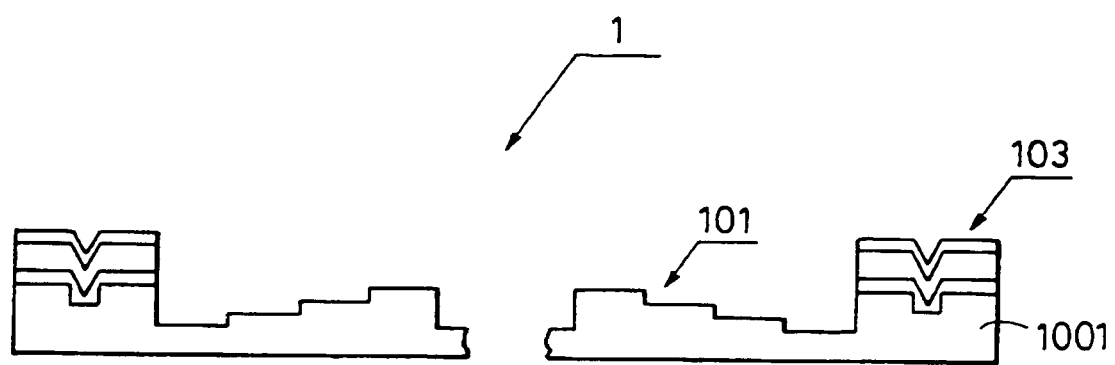
FIG. 16 shows an illustrative drawing of the diffractive optical element according to the present invention in a manufacturing step in the second embodiment.

The upper chromium oxide layer 1407, the intermediate chromium layer 1406 and the lower chromium oxide layer 1405 coated on the grating member area are removed by a reactive ion-etching method. An etching gas such as chlorine gas or a mixed gas of chlorine gas and oxygen gas is used for etching. The photoresist 1501 is subsequently peeled off. FIG. 16 shows an illustrative drawing after the above steps. The refractive optical element 1 having a light-shielding member 103 on the refraction face is thus manufactured by the steps as described above.

The remaining manufacturing step is merely to insert the refractive optical element 1 into the barrel 102 and the like as shown in FIG. 1. When a highly precise centering between the barrel 102 and diffractive optical element 1 is required, centering between the barrel 102 and the diffractive optical element 1 is simplified by taking advantage of the alignment mark 301 used in the process for mounting the lens barrel 102.

Figure 17A:
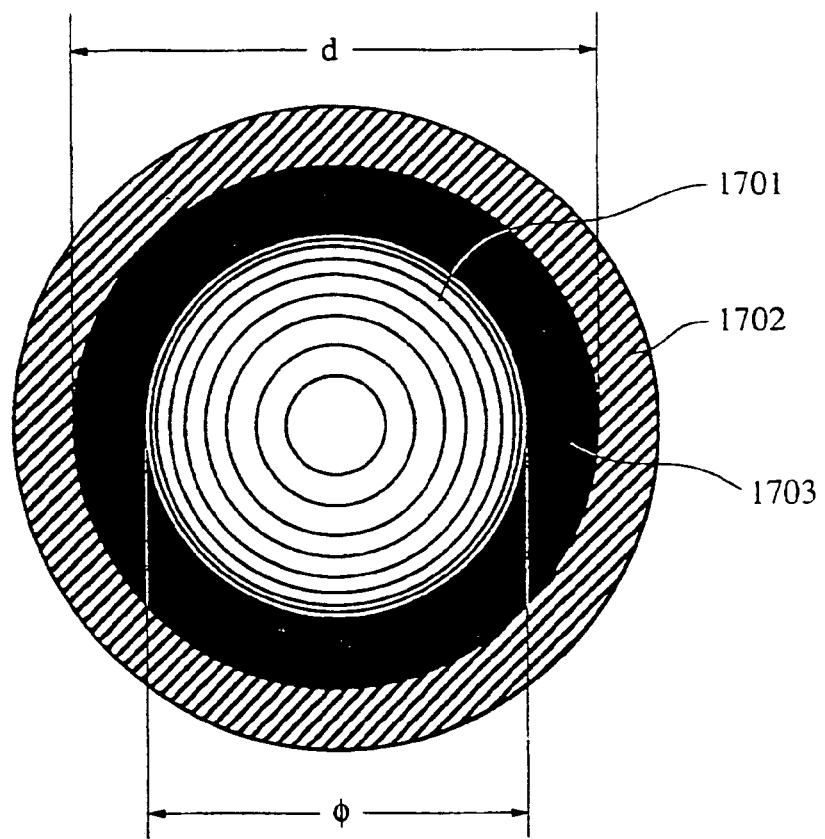
FIG. 17A and FIG. 17B show outlines of the main part of the diffractive optical element in the third embodiment according to the present invention.
Figure 17B:
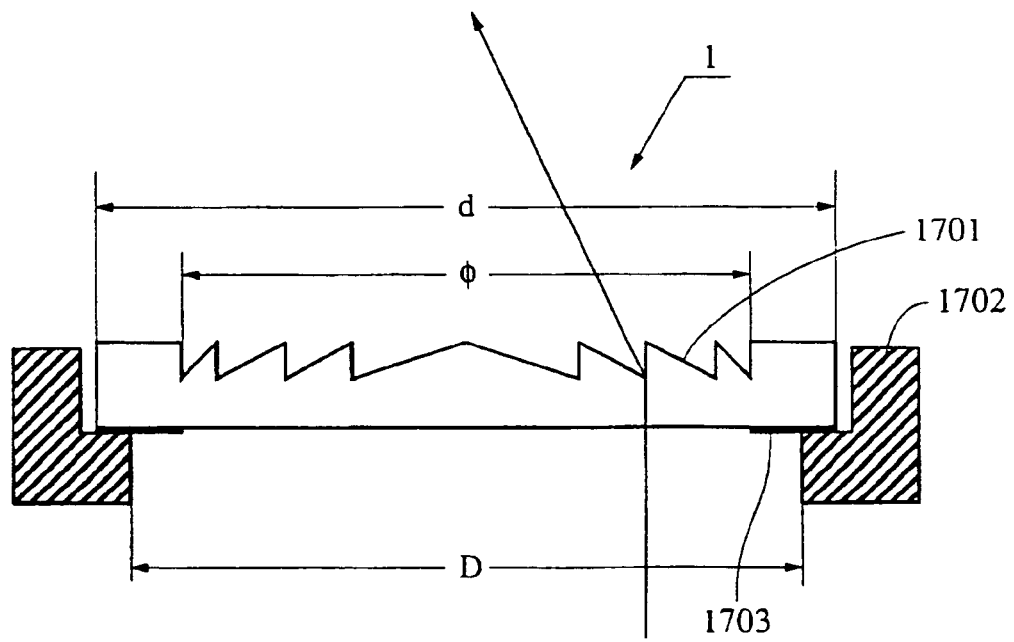

FIG. 17A and FIG. 17B show a front view and cross section, respectively, of the main part of the optical barrel according to the third embodiment having the diffractive optical element according to the present invention.

The present embodiment differs from the first embodiment illustrated in FIG. 1A and FIG. 1B in that a light-shielding member 1703 with a given width is provided around a face opposing the face on which a refraction grating 1701 of the substrate of the diffractive optical element 1 is provided, the other construction being the same. The reference numeral 1702 in the drawing denotes a barrel (a holding frame).

This embodiment is effective when the thickens of the substrate of the diffractive optical element 1 is thin or the pupil of the optical system is disposed in the vicinity of the diffractive optical element. Light-shielding members may be provided in the peripheries of both faces.

The steps of sputtering, coating resists, patterning, etching, and peeling resists, as shown in FIG. 2 through FIG. 5 in the first embodiment, are also applied on the back face of the substrate in the method for manufacturing the diffractive optical element according to this embodiment. The steps may be carried out either before or after processing of the refraction face when the processing steps do not damage the front diffraction face. The center of the diffraction face on the front face and the center of the light-shielding face on the back face can be aligned with good precision by using a dual face exposure apparatus equipped with a dual face alignment mechanism such as the apparatus sold by Karl Zeiss Co. under the trade name "Suss MA25".

The remaining manufacturing step is merely to mount the diffractive optical element 1 in the barrel 1702 and the like as shown in FIG. 17. When a highly precise centering between the barrel and diffractive optical element is required, centering between the barrel and diffractive optical element is simplified by taking advantage of the alignment mark used in the process for mounting in the barrel.

Figure 18A:
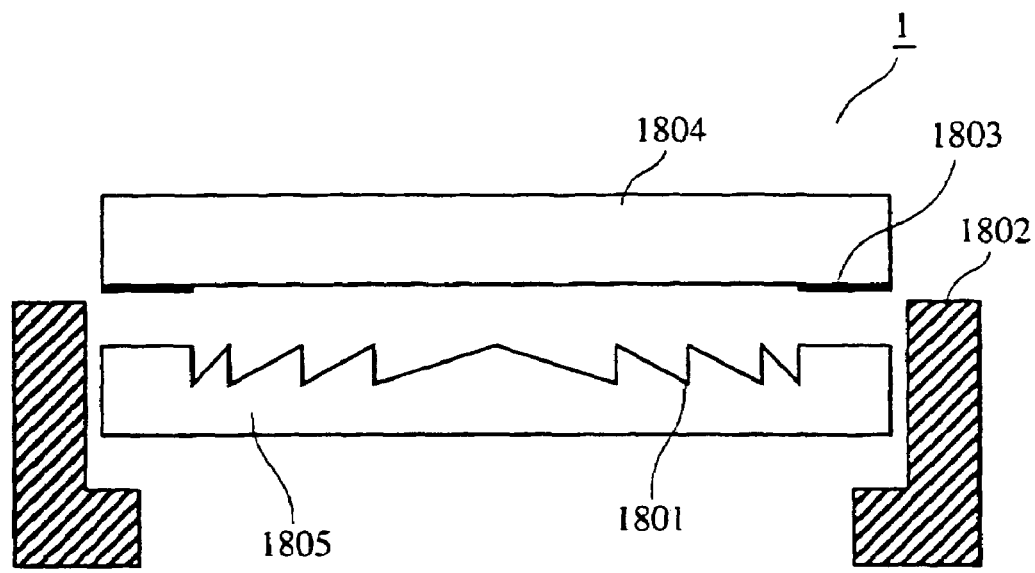
FIG. 18A and FIG. 18B show outlines of the main part of the diffractive optical element in the third embodiment according to the present invention.
Figure 18B:
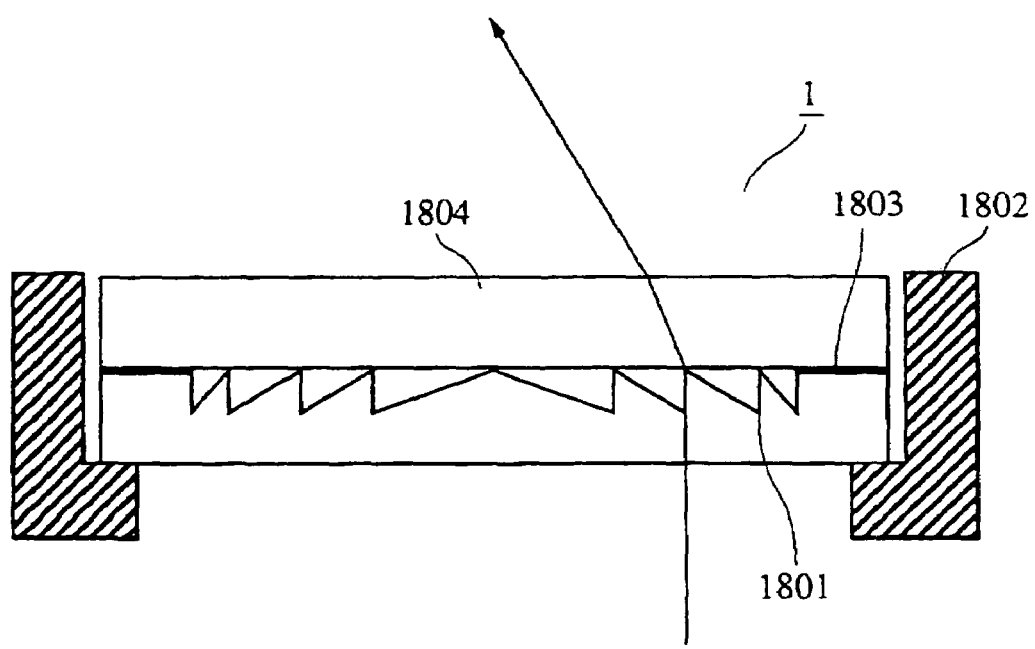

FIG. 18A and FIG. 18B denote the cross sections of the main part of the lens barrel having the refractive optical element in the fourth embodiment according to the present invention. FIG. 8A is an exploded drawing to facilitate understanding of the constructions of respective elements denoted by the reference numerals 1801, 1802, and 1804.

The present embodiment differs from the first embodiment illustrated in FIG. 1A and FIG. 1B in that two independent members of a grating member 1801 provided with a diffraction grating and an optical element 1804 having a light-shielding member 1803 for shielding the incident light to the periphery of the grating member 1801 are disposed in adjoining relation with each other in the diffractive optical element 1, the other construction being the same.

When the grating member 1801 is manufactured by machining the diffraction grating over a wide area on a thin substrate 1805 in the present embodiment, tare deformation by weight of the grating member 1801 is diminished by laminating the optical elements 1804 comprising parallel plates with each other. This processing also serves to protect the diffraction face. A laminated hybrid type diffractive or refractive optical element may be used for the optical element 1804 by allowing it to have a curvature.

For manufacturing the parallel plates 1804 having the light shielding member 1803, the steps of sputtering, coating resists, patterning, etching, and peeling resists, as shown in FIG. 2 through FIG. 5 in the first embodiment, are applied to the parallel plates. As shown in FIG. 3, the optical axis of the diffractive optical element of the grating member 1801 can be aligned with a high precision to the center of the light-shielding member 1803 of the parallel plates 1804 by providing an alignment mark on the light-shielding member

1803 to laminate the parallel plates 1804 by aligning the foregoing alignment mark with the alignment mark on the grating member 1801.

The remaining manufacturing step is merely to insert the refractive optical element 1 in the barrel 1802 and the like as shown in FIG. 18. When a highly precise centering between the lens barrel 1802 and diffractive optical element 1 is required, centering between the lens barrel and refractive diffractive optical element is simplified by taking advantage of the alignment mark used in the process for mounting the lens barrel.

Figure 19A:
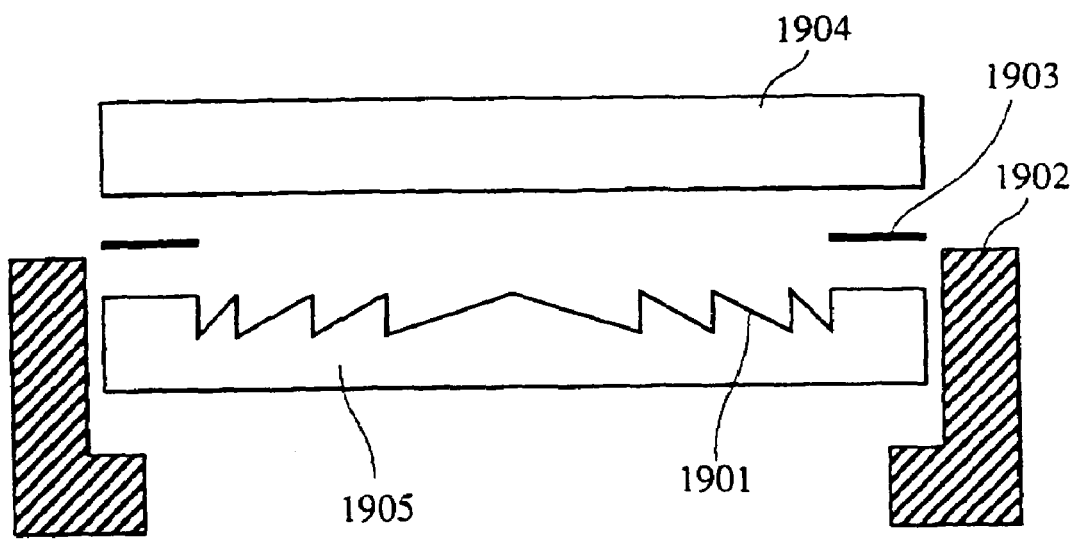
FIG. 19A and FIG. 19B show outlines of the main part of the diffractive optical element in the fifth embodiment according to the present invention.
Figure 19B:
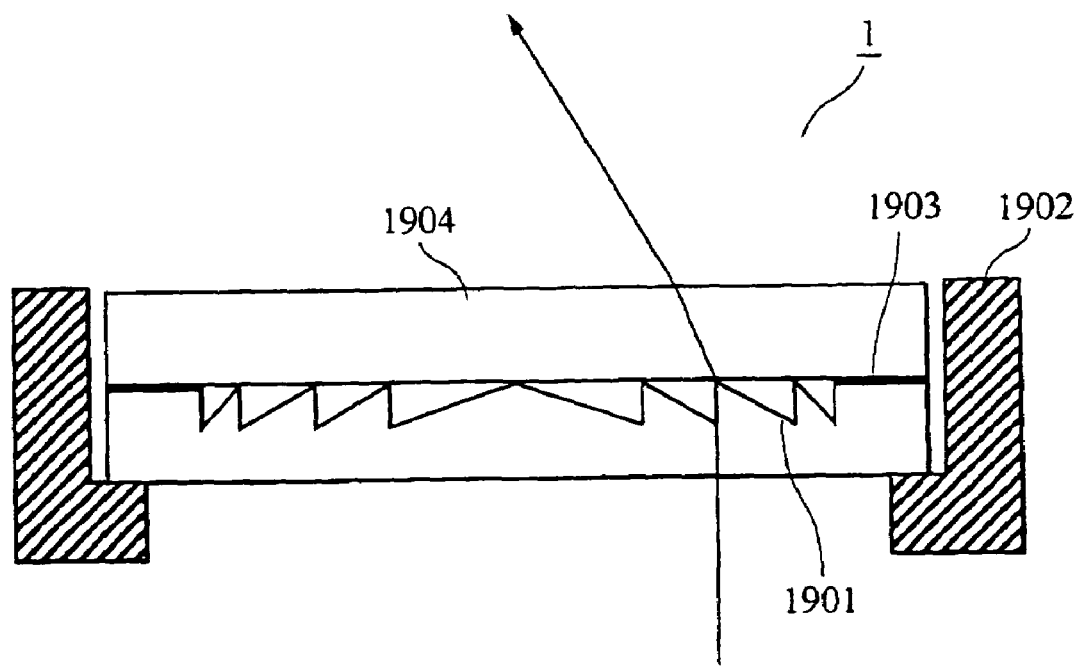

FIG. 19A and FIG. 19B show cross sections of the main part of the optical barrel having the diffractive optical element in the fifth embodiment according to the present invention. FIG. 19A denotes an exploded drawing as shown in FIG. 18A.

The present embodiment differs from the fist embodiment shown in FIG. 1A and FIG. 1B in that the diffractive optical element 1 is composed of three members of a grating member 1901 provided with a diffraction grating, an optical element 1904 comprising parallel plates and a light-shielding member 1903 for shielding the incident light to the periphery of the grating member 1901 disposed between them, the remaining constructions being the same. The reference numeral 1902 denotes a barrel (a holding member).

When the grating member 1901 is manufactured by machining the diffraction grating over a wide area on a thin substrate 1905 in the present embodiment, tare deformation by weight of the grating member 1901 is diminished by laminating the optical elements 1904 comprising parallel plates with each other. This processing also serves to protect the diffraction face. A laminated hybrid type diffractive or refractive optical element is provided for the optical elements 1904 by allowing it to have a spherical or non-spherical curvature.

The light-shielding member 1903 is composed of an inorganic matter, such as metallic thin plate treated to form a black anodized aluminum, a thin plate of an absorbing member comprising a black inorganic ceramic material, or a ring-shaped thin-plate perforated at the center of the metallic thin plate subjected to a surface matte processing.

The diffractive optical element 1 as shown in FIG. 19B is constructed by laminating the grating member 1901 with the light-shielding member 1903 by centering their optical axes by taking advantage of the alignment mark provided when perforating the light-shielding member 1903, the parallel plates 1904 being further laminated thereon to insert the entire diffractive optical element 1 in the barrel.

The sixth embodiment of the diffractive optical element according to the present invention will be described hereinafter.

The diffraction optical element according to the present embodiment differs from the diffraction optical element 1 shown in FIG. 1A and FIG. 1B in that the light-shielding member 103 of the diffraction optical element 1 is provided by printing and the other constructions are the same as in the first embodiment in FIG. 1A and FIG. 1B. The light-shielding member is provided by printing on the substrate 1001 formed via the steps shown in FIG. 10 through FIG. 13 using the alignment mark as a reference point. The printing methods include a screen printing, a tampon printing, and hot-stump printing in which an acrylic or epoxy light-shielding ink is printed at a thickness of several to several tens of microns.

The portions where the ink is coated and is not coated are divided into the portions where the screen is soaked and not soaked with the ink on the screen in the screen printing, and the ink is transferred through the screen. The ink is absorbed in a silicon rubber in the tampon printing to transfer the ink to the substrate in the tampon printing while a light-shielding mask adhered on the film is transferred by heat in the hot-stump printing.

Since the light is illuminated on the bottom face of the light-shielding paint or near the interface of the substrate, gas is not significantly emitted from the surface by light irradiation.

The seventh embodiment of the diffractive optical element according to the present invention will be described hereinafter.

The diffractive optical element according to the present embodiment differs in that the light-shielding member 1703 of the refractive optical element shown in FIG. 17 is provided by printing and the other constructions are the same as in the third embodiment shown in FIG. 17. A light-shielding member is provided on the back face of the substrate 1001 of the diffractive optical element formed via the steps shown in FIG. 10 through FIG. 13 using the surface alignment mark as a reference point. The printing methods include a screen printing, a tampon printing and hot-stump printing in which an acrylic or epoxy light-shielding ink is printed with a thickness of several to several tens of microns.

The eighth embodiment of the diffractive optical element according to the present invention will be described hereinafter.

The diffractive optical element according to the present invention merely differs in that the light-shielding member 1803 in the diffractive optical element shown in FIG. 18 is provided by printing and the other constructions are the same as in the fourth embodiment shown in FIG. 18. The light-shielding member 1803 is provided by printing at the laminated substrate side. The printing methods include a screen printing, a tampon printing and hot-stump printing in which an acrylic or epoxy light-shielding ink is printed at a thickness of several to several tens of microns. The optical axis of the grating member 1801 is aligned with the center of the aperture of the parallel plates 1804 to be laminated at a high precision by taking advantage of an alignment mark provided during or after printing on the light-shielding member 1803.

The emission of gas due to irradiation is suppressed by the member 1904 even when light is illuminated on the light-shielding paint.

Figure 20A:
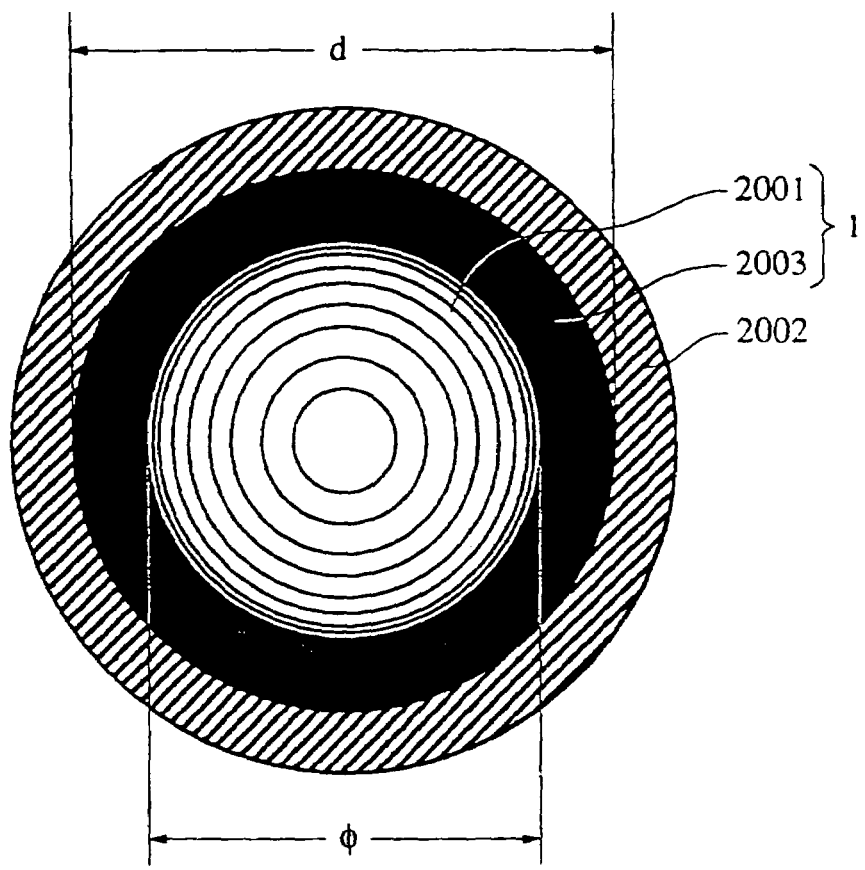
FIG. 20A and FIG. 20B show outlines of the main part of the diffractive optical element in the ninth embodiment according to the present invention.
Figure 20B:
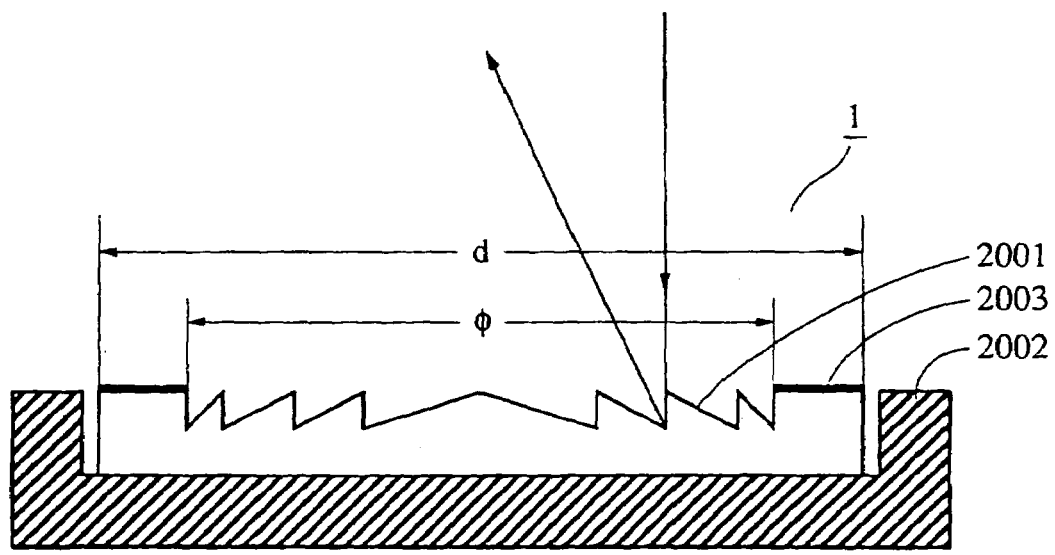

FIG. 20A and FIG. 20B show a front view and cross section, respectively, of the optical barrel having the diffractive optical element in the ninth embodiment according to the present invention.

The present embodiment differs from the first embodiment shown in FIG. 1A and FIG. 1B in that a reflection type diffractive optical element is used instead of the transmission type diffractive optical element, the other construction being the same.

In FIG. 20A and FIG. 20B, the reference numeral 2001 is a grating member provided with a diffraction grating, the reference numeral 2002 denotes a barrel and the reference numeral 2003 denotes a light-shielding member while the letters φ and d representing an effective aperture size of the grating member 2101 and an aperture size of the diffractive optical element 1, respectively.

An example for manufacturing the reflection type refractive optical element 1 shown in FIG. 20A and FIG. 20B will be described hereinafter.

A binary type grating member (a diffractive optical element) is manufactured by the manufacturing method in the second embodiment as shown in FIG. 10 though FIG. 13. Since the depth of etching in the reflection type diffractive optical element differs from the depth of etching in the transmission type diffractive optical element, an etching depth optimized for the reflection type diffractive optical element is selected; After depositing chromium on the entire surface by sputtering, a dielectric layer comprising chromium oxide is deposited on the chromium layer by sputtering. Then, a resist is coated on the layer to develop by selectively exposing the grating member, thereby leaving the resist only at the periphery. In the next step, a reflection type diffractive optical element 1 having a light-shielding member 2103 is manufactured by selectively etching the dielectric layer by a reactive ion etching. The grating member on which the metallic layer is applied serves as a reflection type diffractive optical element having a high reflectivity while the periphery on which the dielectric layer is applied serves as the light-shielding member 2103 having a low reflectivity. The refractive optical element 1 is mounted in a barrel 2002 shown in FIG. 20 and the like thereafter. Aluminum, platinum, gold, or silver may be used for the reflective metallic layer. Alumina and $SiO_2$ are used for the dielectric layer.

A desired wavefront can be obtained for the incident light to the grating member by reflection and diffraction when a light flux having a large aperture size impinges on the grating member by using the diffractive optical element according to the present invention for the optical system, enabling to serve as a diffractive optical element that does not generate stray light and excess light since the incident light to the periphery is shielded with the light-shielding member.

An appropriate manufacturing method selected from the first embodiment through the eighth embodiment may be used depending on the required manufacturing cost and accuracy, because the light-shielding member at the periphery of the reflection type diffractive optical element can be manufactured by the same method as used for manufacturing the light-shielding member of the transmission type diffractive optical element.

While the foregoing embodiments describe the diffractive optical element, the methods can be also applied to the optical elements such as lenses, and prisms, other than the diffractive optical element.

Figure 21:
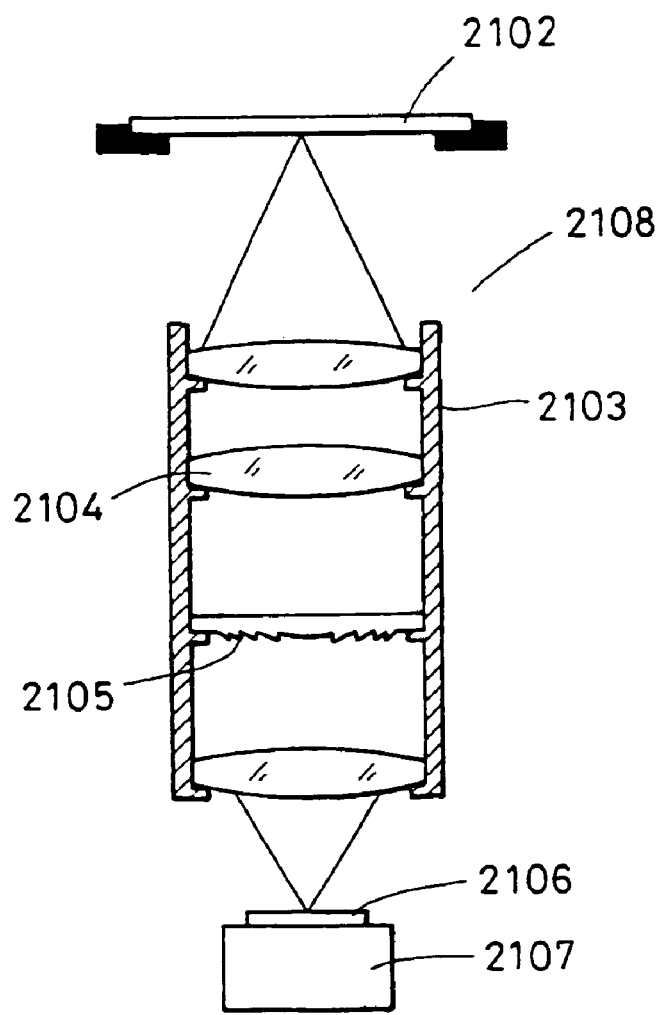
FIG. 21 shows an outline of the main part of the optical system using the diffractive optical element in the 10th embodiment according to the present invention.
Figure 22:
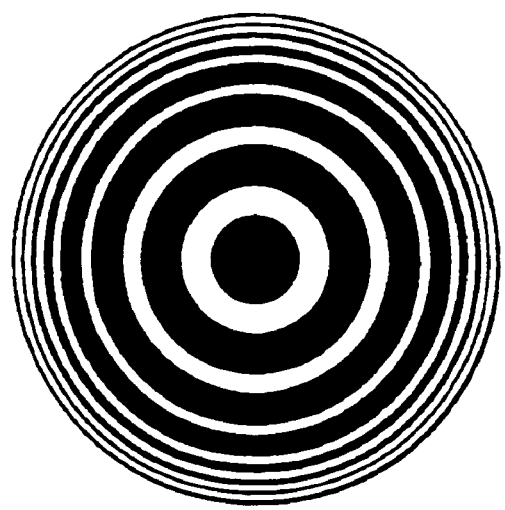
FIG. 22 shows an illustrative drawing of the diffractive optical element in the related art.
Figure 23:
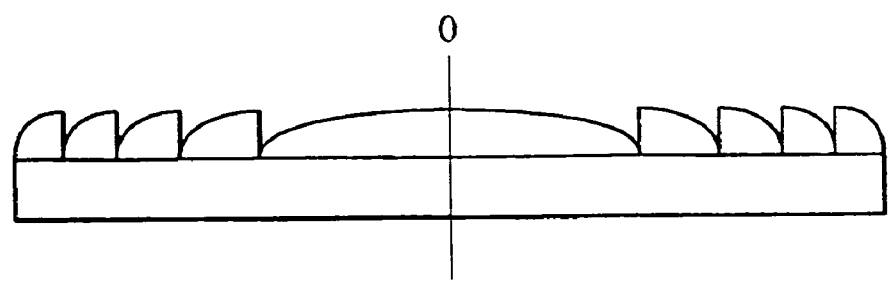
FIG. 23 shows an illustrative drawing of the diffractive optical element in the related art.
Figure 24:
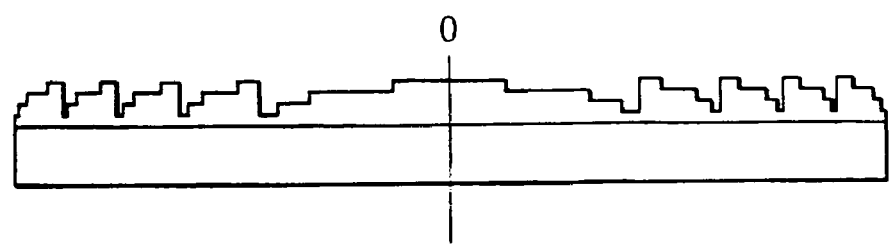
FIG. 24 shows an illustrative drawing of the diffractive optical element in the related art.
Figure 25:
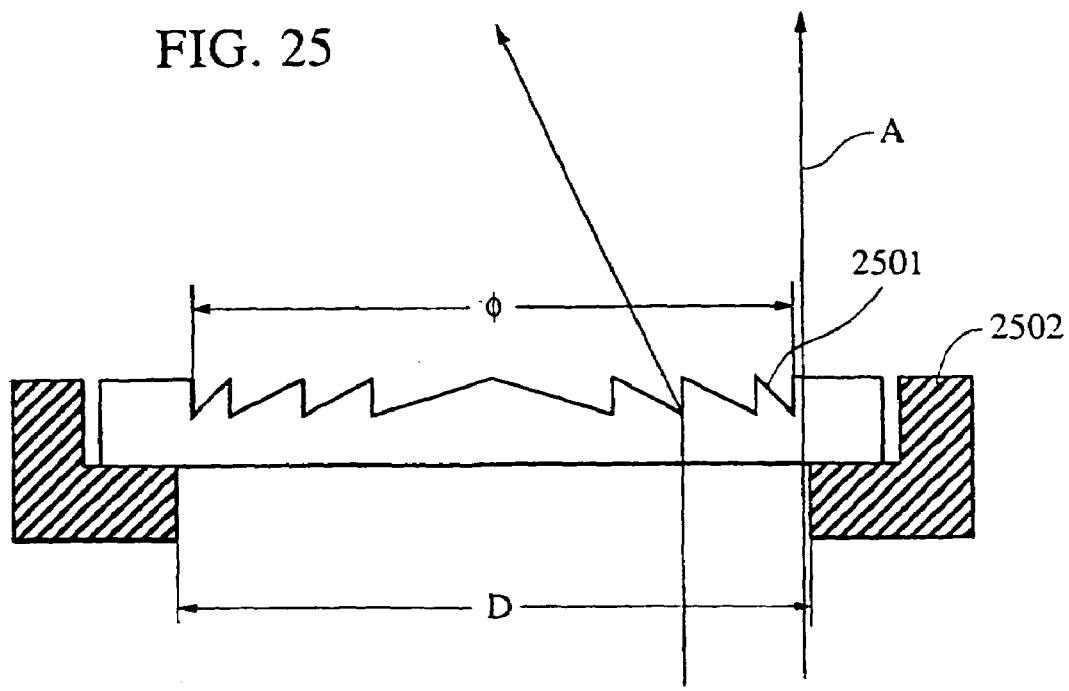
FIG. 25 shows an illustrative drawing of the diffractive optical element in the related art.
Figure 26:
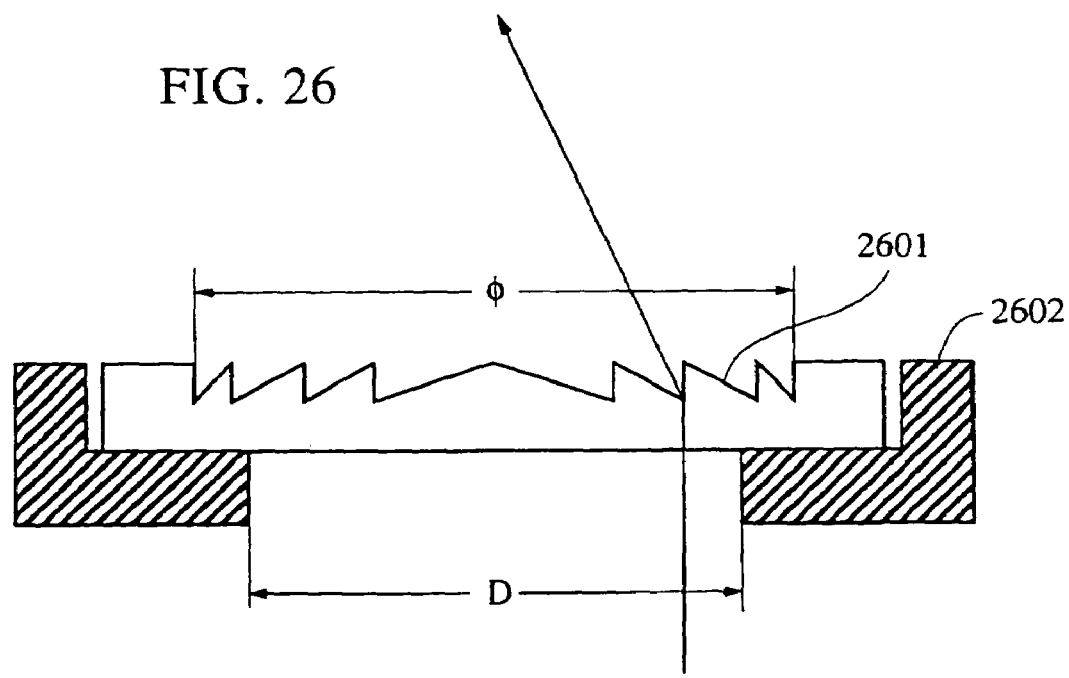
FIG. 26 shows an illustrative drawing of the diffractive optical element in the related art.
Figure 27:
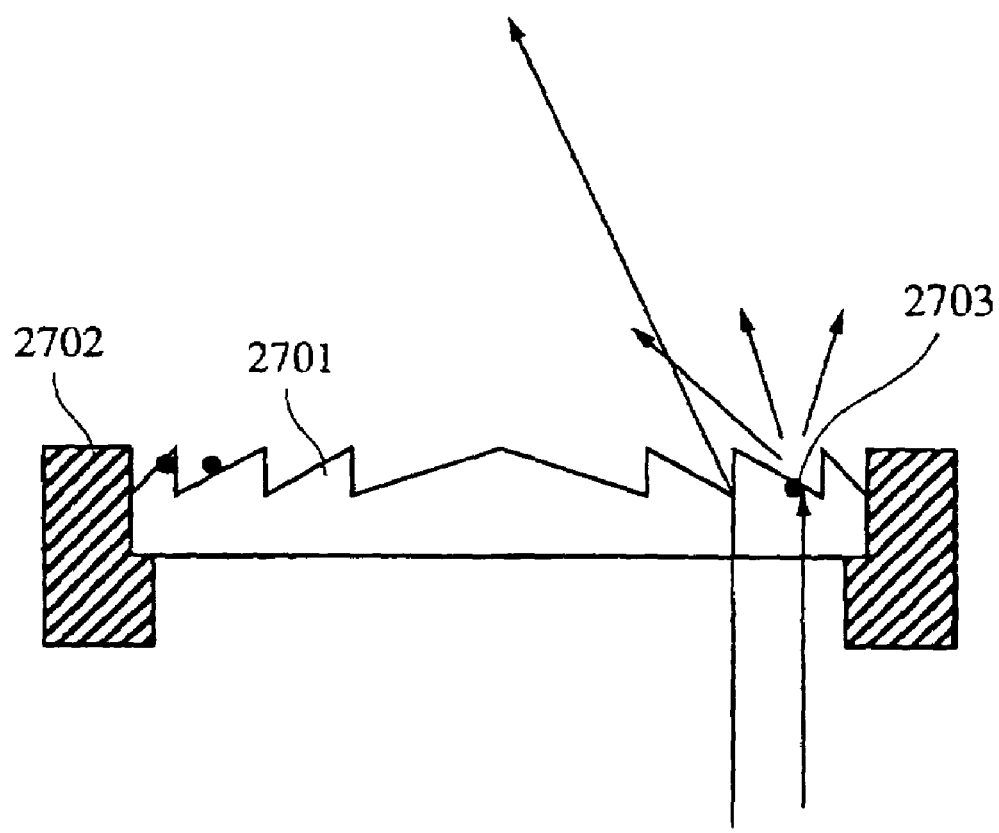
FIG. 27 shows an illustrative drawing of the diffractive optical element in the related art.

FIG. 21 shows the 10th embodiment in which the optical barrel having the diffractive optical element according to the present invention is applied for the projection exposure equipment to be used for the lithographic step among the steps for manufacturing devices including a semiconductor device such as IC and LSI, an imaging device such as CCD and a display device such as a liquid crystal panel.

In FIG. 21, the reference numeral 2101 denotes an illumination optical system including a light source, the reference numeral 2102 denotes a reticle, the reference numeral 2103 denotes a barrel of a projection optical system 2108, the reference-numeral 2104 denote a lens, the reference numeral 2105 denotes a diffractive optical element, the reference numeral 2106 denotes a wafer and the reference numeral 2107 denotes a wafer stage. The diffractive optical element 2105 can be applied to any of the foregoing embodiments, in which, for example, a light-shielding means may be provided at the periphery of the diffraction face of the diffractive optical element according to the first embodiment. The wafer 2106 is positioned at a desired location with the wafer stage 2107, and the height of the wafer is adjusted to the focus position with a focus detecting mechanism (not shown). The reticle is aligned, if necessary, against the mark on the lower layer of the wafer that has been exposed using a detection system (not shown). When focusing and alignment have been completed, the shutter (not shown) is opened to illuminate the reticle with the illumination light form the light source 2101, and the pattern on the reticle 2102 is projected on the wafer 2106 with the projection optical system 2108. A KrF eximer laser or a ArF eximer laser is used for the light source described above, emitting a UV light with a wavelength of 250 nm or less.

The device is manufactured through a development step of the wafer 2106 known in the art. The optical barrel having the diffractive optical element according to the present invention can be also applied to an image-forming optical instrument or an illumination apparatus as well.

According to the present invention, the emission of gas by light illumination on the light-shielding area is reduced, thereby avoiding the problem of fog on the lens as well as prolonging the service life of the apparatus.

Respective embodiments as hitherto described enable reduction of the excess light or scattered light as well as facilitate manufacture of the optical system and maintain good optical performance by appropriately selecting the light-shielding member constituting the optical element, thus attaining an optical element and an optical system using the same.

Providing a light-shielding member comprising a prescribed material at the optical element allows prevention of excess light from being generated besides excluding the necessity of matching the aperture size of the optical barrel with the effective aperture size of the diffractive optical element as seen in the conventional art, thus relaxing tolerance in manufacturing. When the light-shielding member is enlarged, adhesion of foreign matter to the optical element due to cutting of the periphery is reduced, and allows the entire face of the designed and manufactured diffractive optical element to be effectively utilized as a diffractive optical element without any waste.

Alternately, providing an alignment mark on the light-shielding member allows effective utilization when the optical element is required to be centered in the optical barrel with a high precision. This mark is very effective since it does not optically generate excess scattered light.

When the diffractive optical element according to the embodiments as hitherto described are applied to an exposure apparatus, exposure of the wafer is not adversely affected by shielding the light not passing through the diffraction member since the light-shielding mechanism covers the periphery of the diffraction member on the diffraction face of the diffractive optical element. The thickness of the diffractive optical element is less than that of a conventional lens. A high transmittance and exposure efficiency can be attained by manufacturing the diffractive optical element with artificial quartz or fluorite even when the ArF eximer laser or KrF eximer laser is used for the light source.

Because excess transmission light and scattered light are reduced according to the present invention, the optical element can be readily mounted on the exposure apparatus for manufacturing the semiconductor device, enabling a projection optical system having high optical characteristics to be produced. The optical system according to the present invention has a high transmittance when UV light from the ArF eximer laser or KrF eximer laser is used for the light source, enabling to obtain a projection optical system in which the lens material is less deteriorated.

Manufacturing and assembling of the optical system using the optical element are made easy, on the other hand, so that the present invention is widely applicable not only for the exposure apparatus for manufacturing the semiconductor device but also for the general purpose optical instruments.

The eleventh embodiment of the diffractive optical element according to the present invention will be described hereinafter with reference to from FIG. 28 through FIG. 35.

A light-shielding member is formed in the method for manufacturing the element in the present eleventh embodiment after manufacturing a diffractive optical element having four steps. FIG. 28 to FIG. 35 show the manufacturing method in this embodiment.

Figure 28:
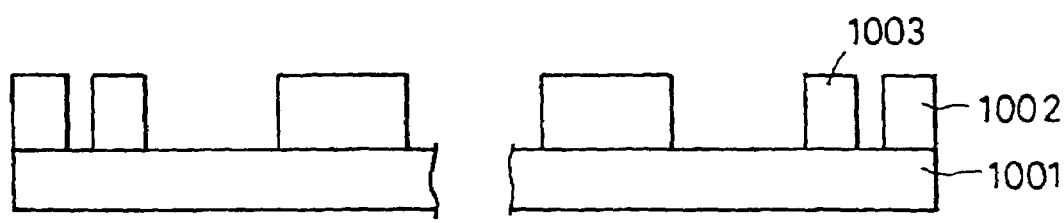
FIG. 28 is an illustrative drawing of the main part in the eleventh embodiment of the diffractive optical element according to the present invention.
Figure 29:
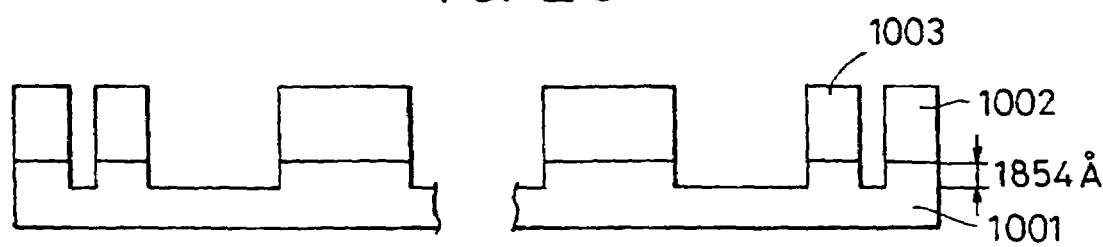
FIG. 29 is an illustrative drawing of the main part in the eleventh embodiment of the diffractive optical element according to the present invention.
Figure 30:
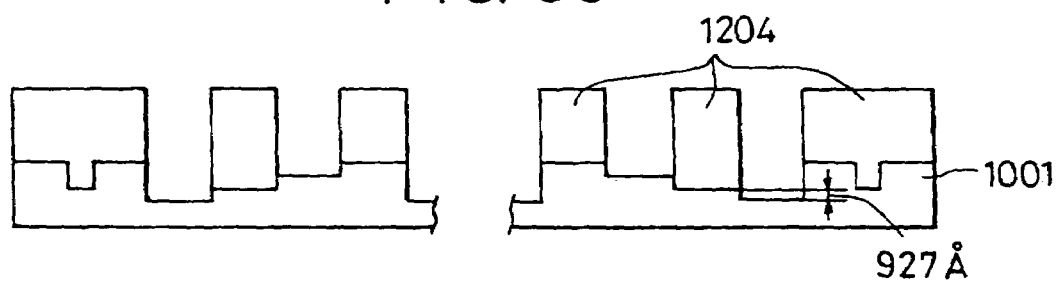
FIG. 30 is an illustrative drawing of the main part in the eleventh embodiment of the diffractive optical element according to the present invention.
Figure 31:
FIG. 31 is an illustrative drawing of the eleventh embodiment according to the present invention.

The first resist pattern 1002 is formed by coating the quartz substrate 1001 with a resist. The resist pattern 1003 for the alignment mark to serve as a reference point for the succeeding steps is also simultaneously formed. This manufacturing step is illustrated in FIG. 28. Then, the quartz substrate 1001 is etches to a depth of 1854 Å using the resist-pattern 1002 as a mask. This manufacturing step is illustrated-in FIG. 29. Then, a photoresist is coated on the substrate 1001 to form the second resist pattern 1204, followed by etching the quartz substrate 1001 to a depth of 977 Å using the resist pattern 1204 as a mask. This manufacturing step is illustrated in FIG. 30. Finally, the resist pattern 1204 are peeled off, thereby completing the grating member of the diffractive optical element shown in FIG. 31.

The depth of etching is optimized against the wavelength 193 nm of the ArF eximer laser light to be ued.

Figure 32:
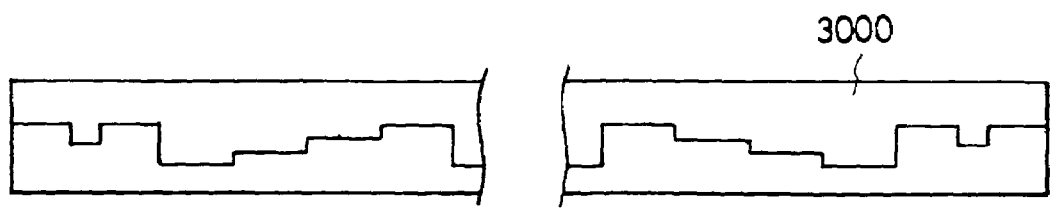
FIG. 32 is an illustrative drawing of the eleventh embodiment according to the present invention.

A photoresist is then spin-coated to form a photoresist layer 3000. This manufacturing step is illustrated in FIG. 32.

Figure 33:
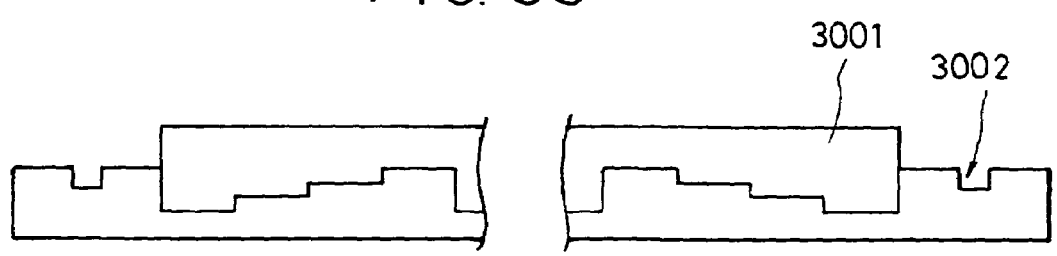
FIG. 33 is an illustrative drawing of the eleventh embodiment according to the present invention.

Next, exposure and development are carried out so that only the element portion is covered with the photoresist 3001 by aligning the element using the alignment mark 3002. This manufacturing step is shown in FIG. 33.

Figure 34:
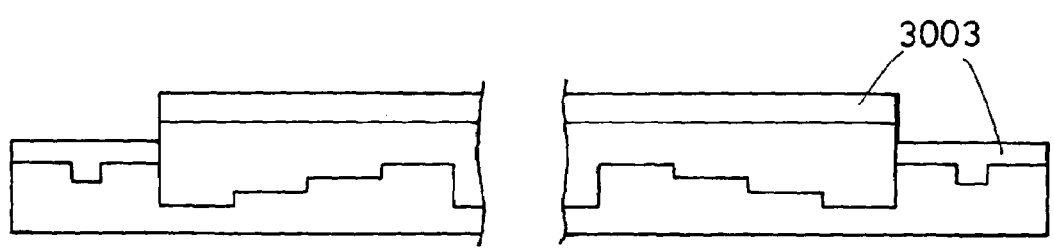
FIG. 34 is an illustrative drawing of the eleventh embodiment according to the present invention.

Then, an aluminum film is deposited to a depth of 1000 Å by sputtering. This manufacturing step is shown in FIG. 34.

While an aluminum film was used for the step described above, the succeeding steps would not be altered by depositing one of any materials of molybdenum, tantalum, tungsten, molybdenum siliside, tungsten siliside, silicon and silicon oxide instead of aluminum, because these materials largely absorb or reflect the light at a wavelength of around 193 nm or, sufficiently serving as a light shielding film.

Figure 35:
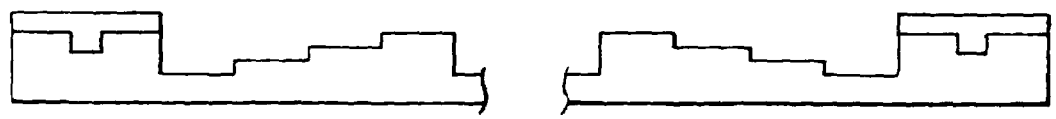
FIG. 35 is an illustrative drawing of the eleventh embodiment according to the present invention.

In the next manufacturing step, the aluminum film and photoresist film on the element are simultaneously removed by a lift-off method using a peeling solution for the resist. When lift-off is difficult, a scrubber may be used. The element having the light-shielding member is completed after the lift-off step has been applied. This manufacturing step is shown in FIG. 35.

The element according to the present embodiment is also applicable to the optical system in FIG. 21.

What is claimed is:

1. A method of manufacturing a diffractive optical element, which is used for an optical system of an exposure apparatus, said diffractive optical element comprising:
   (i) an effective area;
   (ii) a peripheral area surrounding the effective area;
   (iii) a light-shielding member composed of a laminated layer of Cr oxide and Cr disposed on a surface of the peripheral area; and
   (iv) a holding frame,
   wherein the laminated layer includes an alignment mark at a predetermined position with respect to the center of the effective area and in relation to the holding frame so as to center the effective area in the holding frame, said method comprising the steps of:
   coating a substrate with photoresist;
   patterning the photoresist into a pattern for making the alignment mark and a pattern for making the effective area;
   etching the substrate covered with the patterned resist;
   peeling the photoresist;
   forming the light-shielding member and the alignment mark by forming a laminated layer of Cr oxide and Cr on the peripheral area of the substrate; and
   attaching the substrate to the holding frame.

2. An exposure apparatus for exposing a wafer to a pattern of a mask by using the optical system including the diffractive optical element according to claim 1.

3. A device manufacturing method comprising:
   a step of exposing a wafer to a device pattern of a mask by the exposure apparatus according to claim 2; and
   a step of developing the exposed wafer.

* * * * *

UNITED STATES PATENT AND TRADEMARK OFFICE
CERTIFICATE OF CORRECTION

PATENT NO. : 6,967,796 B2
APPLICATION NO. : 09/393966
DATED : November 22, 2005
INVENTOR(S) : Seiji Takeuchi et al.

It is certified that error appears in the above-identified patent and that said Letters Patent is hereby corrected as shown below:

Column 3,
Line 58, "anti reflection" should read -- anti-reflection --.

Column 4,
Line 62, "third" should read -- fourth --.

Column 5,
Line 49, "frennel" should read -- Fresnel --.

Column 6,
Line 53, "2440 A" should read -- 2440 Å --.
Line 54, "peeling 15" should read -- peeling --.
Line 59, "1220 A" should read -- 1220 Å --.

Column 7,
Line 2, "alignment 5" should read -- alignment --.
Line 8, "service" should read -- service life --.
Line 57, "refractive optical element 1" should read -- diffractive optical element 1 --.

Column 8,
Line 38, "FIG. 8A" should read -- FIG. 18A --.

Column 9,
Line 5, "refractive optical element 1" should read -- diffractive optical element 1 --.
Line 8, "refrac-" should read -- diffrac- --.
Line 17, "fist" should read -- first --.
Line 41, "thin-plate" should read -- thin plate --.

Column 11,
Line 6, "selected;" should read -- selected. --.
Line 55, "reference-numeral 2104 denote" should read -- reference numeral 2104 denotes --.

Column 12,
Line 6, "a" should read -- an --.

UNITED STATES PATENT AND TRADEMARK OFFICE
CERTIFICATE OF CORRECTION

PATENT NO. : 6,967,796 B2
APPLICATION NO. : 09/393966
DATED : November 22, 2005
INVENTOR(S) : Seiji Takeuchi et al.

It is certified that error appears in the above-identified patent and that said Letters Patent is hereby corrected as shown below:

Column 13,
Line 16, "etches" should read -- etched --.
Line 18, "trated-in" should read -- trated in --.
Line 26, "ued." should read -- used. --.
Line 39, both occurrences of "siliside," should read -- silicide, --.

Signed and Sealed this

Fourth Day of July, 2006

JON W. DUDAS
*Director of the United States Patent and Trademark Office*